United States Patent
Kamm

(10) Patent No.: US 9,366,376 B2
(45) Date of Patent: Jun. 14, 2016

(54) TELESCOPING PORTABLE CAMERA JIB

(71) Applicant: Zeke L. Kamm, Bend, OR (US)

(72) Inventor: Zeke L. Kamm, Bend, OR (US)

( * ) Notice: Subject to any disclaimer, the term of this patent is extended or adjusted under 35 U.S.C. 154(b) by 0 days.

(21) Appl. No.: 13/940,956

(22) Filed: Jul. 12, 2013

(65) Prior Publication Data

US 2014/0014807 A1    Jan. 16, 2014

Related U.S. Application Data

(60) Provisional application No. 61/670,657, filed on Jul. 12, 2012.

(51) Int. Cl.
*F16M 11/04*   (2006.01)
*F16M 11/16*   (2006.01)
*F16M 11/32*   (2006.01)
*F16B 7/14*    (2006.01)

(52) U.S. Cl.
CPC ............. *F16M 11/04* (2013.01); *F16M 11/046* (2013.01); *F16M 11/048* (2013.01); *F16M 11/16* (2013.01); *F16M 11/32* (2013.01); *F16B 7/14* (2013.01); *F16M 2200/022* (2013.01); *F16M 2200/041* (2013.01); *F16M 2200/063* (2013.01)

(58) Field of Classification Search
CPC .. H04N 1/00562; G03B 17/561; G03B 17/56; F16M 11/00; F16M 11/24; F16M 13/041; F16M 2200/04
USPC .......... 248/187.1, 177.1, 178.1, 179.1, 180.1, 248/183.1, 12.11, 123.2, 125.7, 280.11, 248/281.11, 292.113, 292.11; 396/420–423
See application file for complete search history.

(56) References Cited

U.S. PATENT DOCUMENTS

| | | | | | |
|---|---|---|---|---|---|
| 2,945,428 | A | * | 7/1960 | Dearborn | 396/421 |
| 3,486,514 | A | * | 12/1969 | Prescott | 135/90 |
| 3,756,549 | A | * | 9/1973 | Lange | 248/123.2 |
| 3,790,773 | A | * | 2/1974 | Sapper | 362/401 |
| 4,065,994 | A | * | 1/1978 | Streit | 84/453 |

(Continued)

FOREIGN PATENT DOCUMENTS

CN       202794809 U      3/2013

OTHER PUBLICATIONS

"Kessler Pocket Jib Pro", "Available from: http://www.kesslercrane.com/product-p/pocket_jib_pro.htm", Jan. 7, 2014.

(Continued)

*Primary Examiner* — Nkeisha Smith
(74) *Attorney, Agent, or Firm* — Loginov & Associates, PLLC; William A. Loginov

(57) ABSTRACT

This invention provides a portable camera jib assembly that is retractable between a relatively short retracted position and a significantly extended fully elongated position. The jib assembly is constructed from a series of upper and lower telescoping tubes that nest within each other. It includes a bottom bracket that is pivotally attached to a tripod base and a top, camera-supporting bracket that is attached to an end of the upper and lower telescoping tubes. The tubes include twist-lock rings to maintain a predetermined length of extension, and notably, the bottom bracket includes upper and lower knuckles that slidably guide the respective upper and lower tubes so as to allow complete retraction of the tubes that brings the top bracket into close proximity with the bottom bracket—thereby ensuring a highly compact shape when fully retracted for enhanced portability.

8 Claims, 10 Drawing Sheets

(56) References Cited

U.S. PATENT DOCUMENTS

| | | | | |
|---|---|---|---|---|
| 4,222,654 | A * | 9/1980 | Bodenhamer | 396/428 |
| 4,849,778 | A * | 7/1989 | Samuelson | 396/428 |
| 5,033,705 | A * | 7/1991 | Reagan | 248/123.11 |
| 5,513,829 | A * | 5/1996 | Hodges | 248/670 |
| 5,531,412 | A * | 7/1996 | Ho | 248/123.2 |
| 5,791,623 | A * | 8/1998 | Louridas | 248/451 |
| 5,908,181 | A * | 6/1999 | Valles-Navarro | 248/177.1 |
| 5,940,645 | A * | 8/1999 | Bonin | 396/428 |
| 6,105,909 | A * | 8/2000 | Wirth et al. | 248/123.2 |
| 6,752,541 | B1 * | 6/2004 | Dykyj | 396/428 |
| 6,776,488 | B2 * | 8/2004 | Burbulla | 352/243 |
| 6,932,305 | B2 * | 8/2005 | Morales et al. | 248/187.1 |
| 7,037,006 | B2 * | 5/2006 | Chapman | 396/428 |
| 7,229,053 | B2 * | 6/2007 | Speggiorin | 248/163.1 |
| 7,249,740 | B1 * | 7/2007 | Morales et al. | 248/187.1 |
| 7,522,213 | B2 * | 4/2009 | Chapman | 348/373 |
| 7,854,556 | B2 * | 12/2010 | Wood | 396/428 |
| 7,942,378 | B2 * | 5/2011 | Nakamura | 248/564 |
| 8,006,850 | B2 * | 8/2011 | Rotheisler | 212/196 |
| 8,128,295 | B2 * | 3/2012 | Pizzo et al. | 396/420 |
| 8,528,868 | B2 * | 9/2013 | Leung | 248/125.8 |
| 8,567,952 | B2 * | 10/2013 | Taylor | 352/243 |
| 8,657,507 | B2 * | 2/2014 | Di Leo | 396/420 |
| 8,702,327 | B2 * | 4/2014 | Chapman | 396/428 |
| 8,721,199 | B1 * | 5/2014 | Hart | 396/428 |
| 2001/0010764 | A1 * | 8/2001 | Sherwin | 396/428 |
| 2006/0065796 | A1 * | 3/2006 | Valette et al. | 248/176.1 |
| 2006/0228105 | A1 * | 10/2006 | Chapman | 396/419 |
| 2007/0133978 | A1 * | 6/2007 | Kokush | 396/428 |
| 2009/0097840 | A1 * | 4/2009 | Amadril et al. | 396/428 |
| 2009/0152414 | A1 * | 6/2009 | Lyons | 248/176.1 |
| 2010/0193457 | A1 * | 8/2010 | Rotheisler | 212/195 |
| 2010/0266272 | A1 * | 10/2010 | Holway et al. | 396/428 |
| 2013/0034347 | A1 * | 2/2013 | Randy et al. | 396/428 |
| 2013/0209085 | A1 * | 8/2013 | Wood et al. | 396/428 |
| 2014/0064720 | A1 * | 3/2014 | Chapman | 396/428 |
| 2014/0097307 | A1 * | 4/2014 | McKay et al. | 248/122.1 |
| 2014/0099092 | A1 * | 4/2014 | Di Leo | 396/420 |

OTHER PUBLICATIONS

Fast Forward Time.Co.Uk, "Fast Forward Time Limited, Mini Carbon Fibre Travel Jib for DSLR Video", "Available from http://www.fastforwardtime.co.uk/cam-carbon-fibre-jib?language=en&currency=GBP&gclid=CKWvxNiy6bsCFQuuwwodP1IA2Q", Jan. 7, 2014, Published in: UK.

* cited by examiner

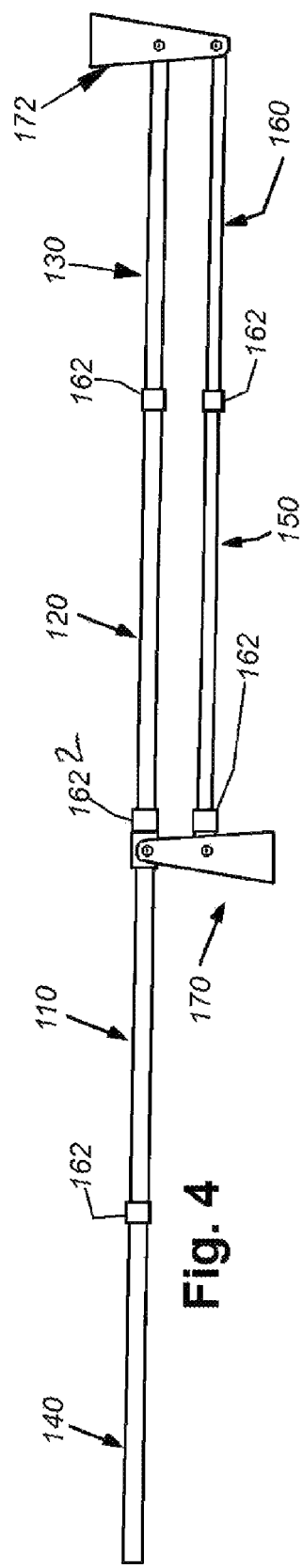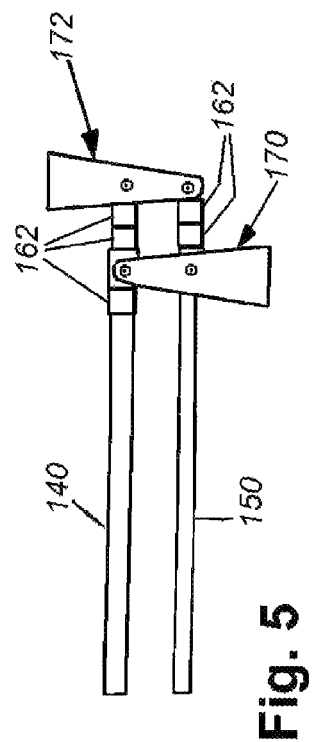

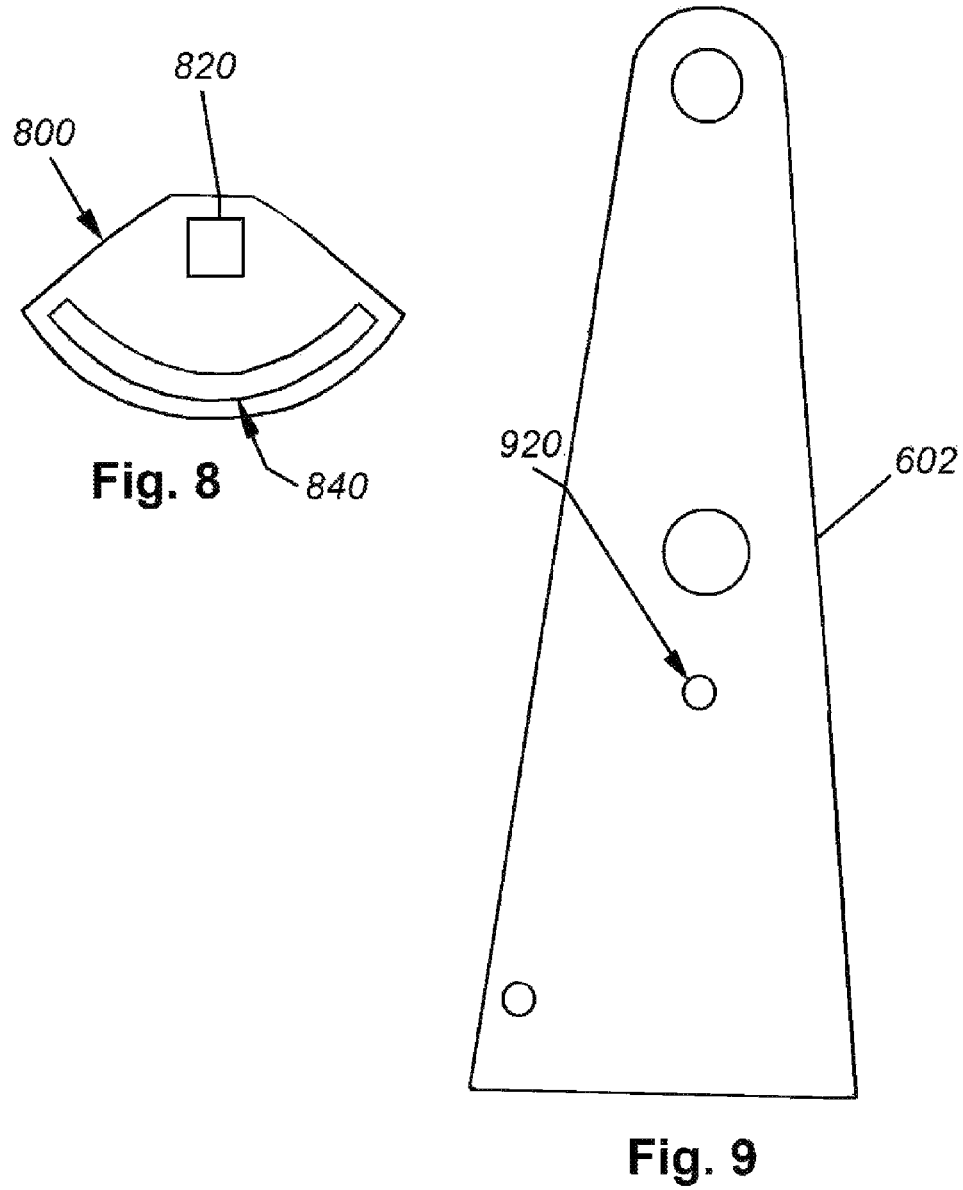

TELESCOPING PORTABLE CAMERA JIB

RELATED APPLICATIONS

This application claims the benefit of U.S. Provisional Application Ser. No. 61/670,657, filed Jul. 12, 2012, entitled TELESCOPING PORTABLE CAMERA JIB, the entire disclosure of which is herein incorporated by reference.

FIELD OF THE INVENTION

This invention relates to camera accessories and more particularly to camera jibs.

BACKGROUND OF THE INVENTION

Camera jibs are an indispensable tool in both still photography and motion picture production. In general, a camera jib assembly consists of a tripod that supports the jib element off the ground (or other surface) and a jib boom that includes a pivot point adjacent to the tripod base. The pivot balances a weighted end and an opposing camera-carrying end, each of which extend outwardly a predetermined distance from the pivot. The camera carrying end is typically articulated with respect to the pivot so that the camera remains level as the boom is pivoted between a negative incline (i.e. sloping downwardly, and depressed beneath the level of the tripod base) and a positive incline (i.e. sloping upwardly, and elevated above the level of the tripod base).

Most commercially available jibs are relatively large, heavy and expensive. They do not generally lend themselves to substantial portability. However, as high-quality photographic and video equipment becomes lighter, there is both a need and a desire to bring such equipment to remote sites and locations that are not normally susceptible to heavy film equipment. For example, certain contemporary survival and nature films may require a single-person or very small crew. Likewise, amateurs increasingly desire access to professional-quality equipment and photographic/filming techniques.

Thus, it is desirable to provide a camera jib that allows for professional results (i.e. a long extension length and significant depression/elevation). This jib should be lightweight and portable, but should remain sturdy and durable in the field.

SUMMARY OF THE INVENTION

This invention overcomes disadvantages of the prior art by providing a portable camera jib assembly that is retractable between a relatively short retracted position and a significantly extended fully elongated position. The jib assembly is constructed from a series of upper and lower telescoping tubes that nest within each other. It includes a bottom bracket that is pivotally attached to a tripod base and a top, camera-supporting bracket that is attached to an end of the upper and lower telescoping tubes. The tubes include twist-locks to maintain a predetermined length of extension, and notably, the bottom bracket includes upper and lower knuckles that slidably guide the respective upper and lower tubes so as to allow approximately complete retraction of the tubes that brings the top bracket into close proximity with the bottom bracket—thereby ensuring a highly compact shape when fully retracted for enhanced portability. The knuckles of the bottom bracket are illustratively, pivotally connected to the bottom bracket using shortened fasteners (e.g. bolts or screws) that do not pass through the inner diameter of the knuckle—but rather are secured to unitary end extensions on each of opposing sides of the knuckle. In this manner tubes are free to slide with respect to the knuckles. The tubes and other components of the jib are constructed of a lightweight material such as aluminum alloy and/or a composite (e.g. carbon fiber). The inner and outer diameters of the tubes are chosen for a snug, but slidable fitment.

In an illustrative embodiment, the camera jib includes a plurality of upper telescoping tubes and lower telescoping tubes capable of being locked into a desired extension position by locks between each of the upper telescoping tubes and each of the lower telescoping tubes, respectively. A top bracket is provided. This top bracket is capable of securely holding a variety of cameras, and is pivotally mounted to an end of each of the upper telescoping tubes and the lower telescoping tubes at respective pivot points. A pivoting bottom bracket is also provided. This bottom bracket is securable to an optional tripod base, and is pivotally mounted to a location along each of the upper telescoping tubes and the lower telescoping tubes at respective pivot points. Notably, the bottom bracket includes an upper knuckle and lower knuckle that each pivot with respect to side plates of the bottom bracket, the upper knuckle and the lower knuckle each slidably guiding the respective upper telescoping tubes and lower telescoping tubes. This arrangement allows approximately complete retraction of the tubes and brings the top bracket into close proximity with the bottom bracket.

BRIEF DESCRIPTION OF THE DRAWINGS

The invention description below refers to the accompanying drawings, of which:

FIG. 4 is a side view of an illustrative embodiment of the jib in a fully elongated arrangement;

FIG. 5 is a side view of the jib of FIG. 4 in a fully collapsed arrangement;

FIG. 8 is a side view of an illustrative embodiment of the jib tilt lock plate;

FIG. 9 is a side view of an illustrative embodiment of the bottom bracket plate;

DETAILED DESCRIPTION

Figure 1:
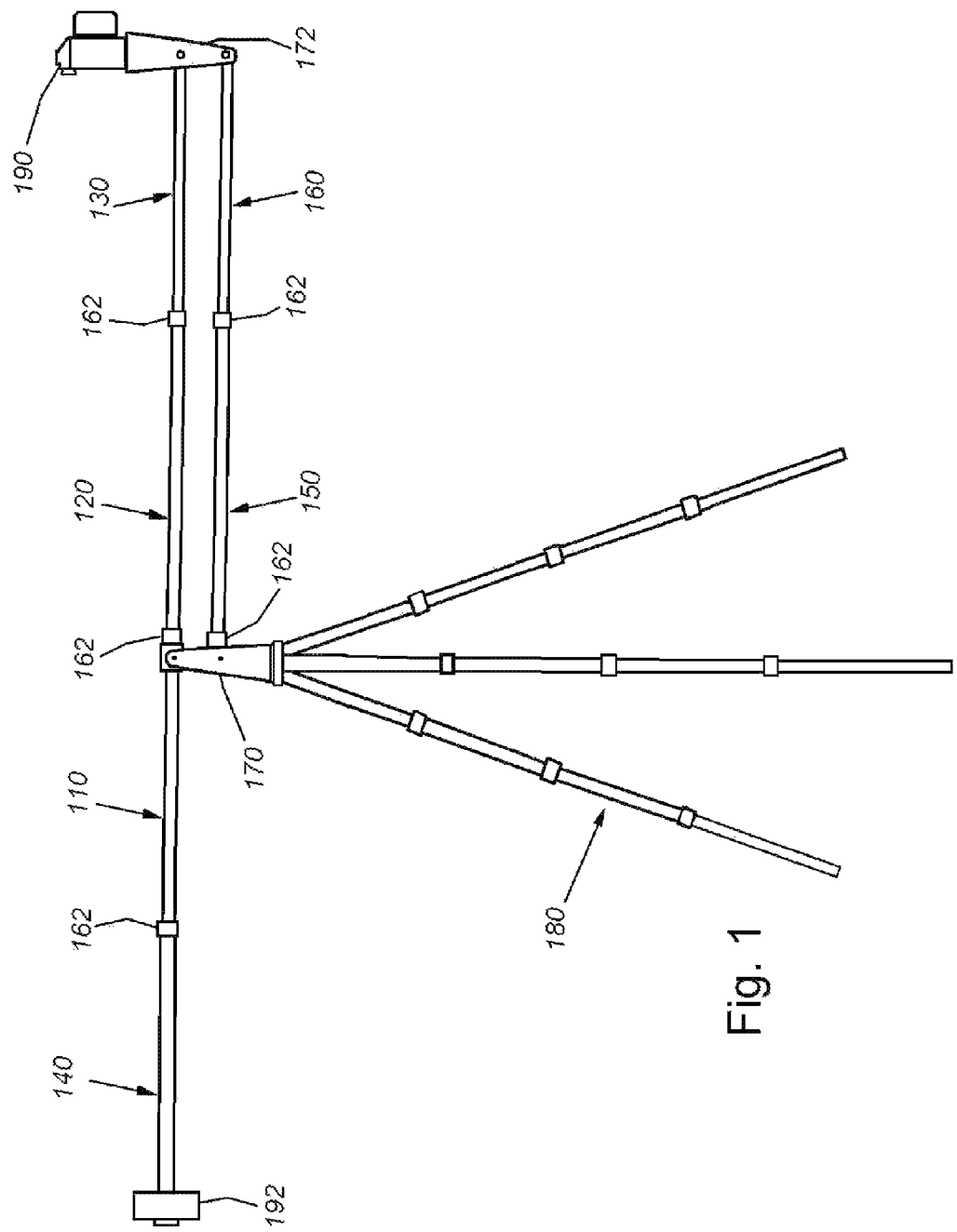
FIG. 1 is a side view of the telescoping portable camera jib arranged in a fully elongated and level position and mounted to a tripod base according to an illustrative embodiment of this invention.

FIG. 1 shows an exemplary telescoping portable camera jib arranged in a fully elongated and level position and mounted to a tripod base according to an illustrative embodiment of this invention. The tube sections 110, 120, 130, 140, 150, and 160 are each approximately 1.5 feet in length and securable by twist-locking rings 162. Each exposed end of the tubes contains a hole plug (not shown) to prevent taking on debris and limit possible erosion of the internal walls of the tubes. The largest diameter tube 140 is approximately 32 mm wide, while the remaining tubes are of a slightly smaller diameter so as to prove a snug, but slidable fitment.

The arrangement of telescoping tubes pivots on a bottom bracket mechanism 170 adjacent to an optional tripod base 180. A second bracket mechanism 172 is positioned on one end of the jib and holds an exemplary camera 190 having a weight of up to approximately seven pounds in an embodiment. The end of the jib opposing the camera features a tap plug 192 which optionally secures specialized or conventional plate weights to the end of the jib. In conjunction with the pivoting bottom bracket 170 and the tube sections 110, 120, 130, 140, 150, and 160, the weighted end of the jib assists operation by photographers and videographers by counterbalancing the weight of the camera and jib components in a manner that holds the camera 190 in a particular predetermined position or causes desired upward or downward movement (i.e. causes the slope of the jib to move upward or downward as desired).

Figure 2:
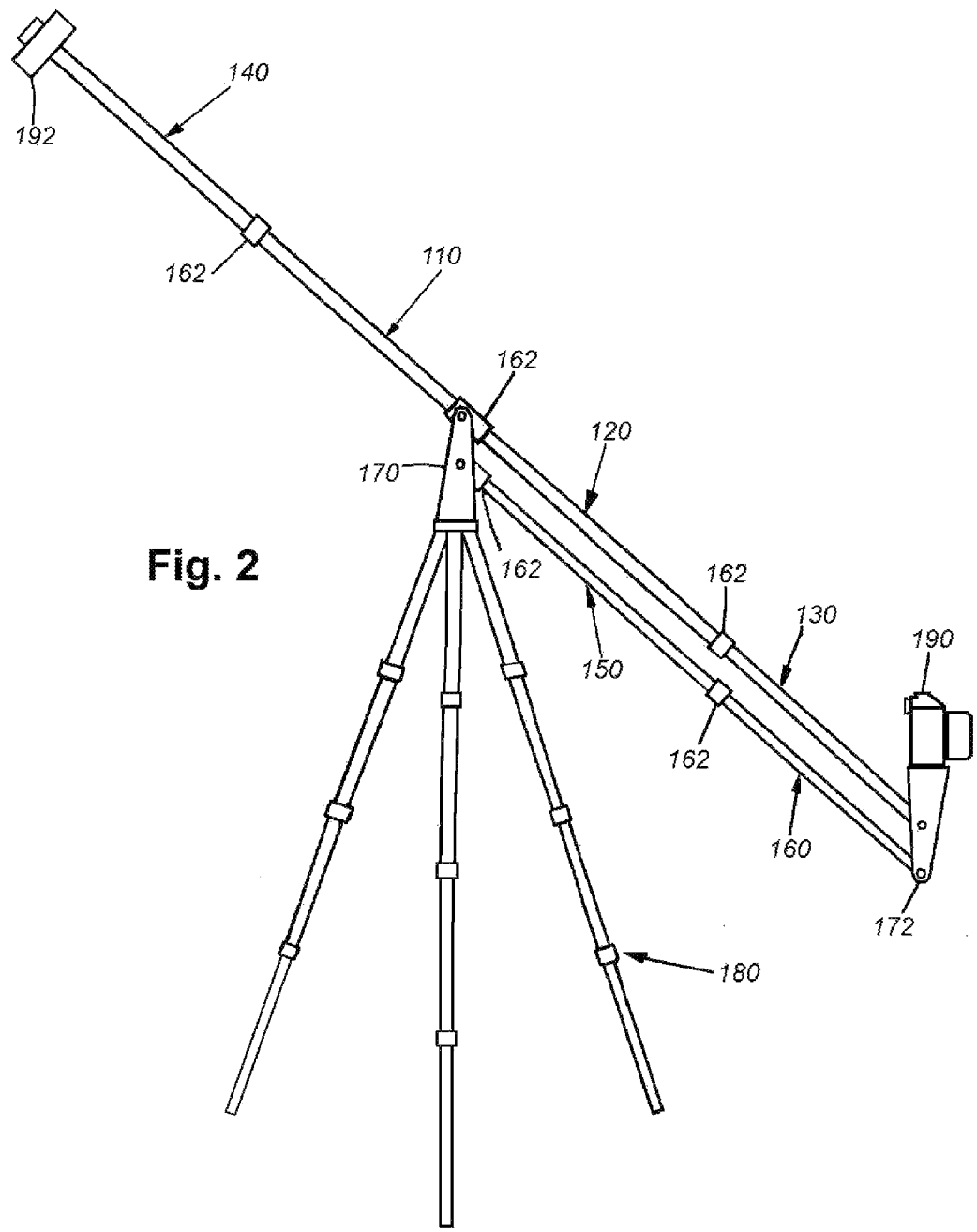
FIG. 2 is a side view of the jib of FIG. 1 biased into a downward sloping, depressed position.
Figure 3:
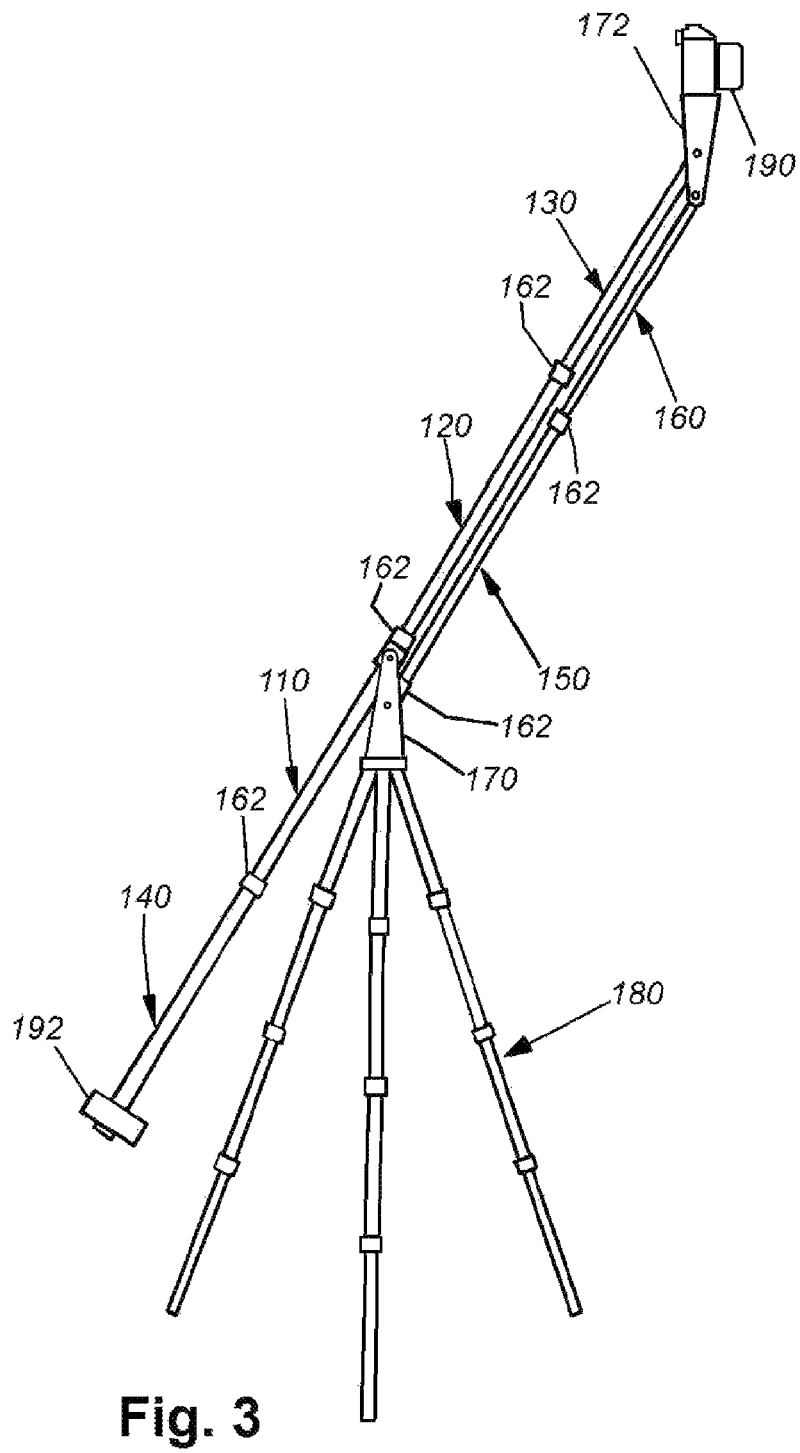
FIG. 3 is a side view of the jib of FIG. 1 biased into an upward sloping, elevated position.

By way of example, FIG. 2 shows the jib of FIG. 1 biased into a downward-sloping position, and FIG. 3 shows the jib of FIG. 1 biased into an upward-sloping position. Notably, the top bracket remains level regardless of the jib's slope. By way of further example, adding weight to the tap plug 192 and elevating that end of the jib causes the camera resting on the top bracket to rise more quickly. Alternatively, removing weight from the tap plug 192 causes the camera to rise more slowly, stabilize, or fall at a desired speed depending on the weight and initial slope of the jib.

It is expressly contemplated that the tap plug can be designed to hold both specially designed jib weights and alternative weight systems. By way of example, the tap plug 192 can be designed to hold a weight bag capable of holding rocks or other matter discovered on the scene of a video shoot. Such a feature further facilitates the portability of this invention by allowing users to take advantage of the benefits of a weighted jib without having to carry weights to a shoot location. The jib's weight is further minimized by the use of sturdy, but lightweight materials in constructing the tube sections. Depending on the needs of the user, the tubes can be comprised of aluminum alloys, carbon fiber, or other composite materials. The total weight of the exemplary jib is approximately 3.75 pounds, or less when comprised of certain composite materials.

FIGS. 4 and 5 demonstrate the collapsing and/or telescoping feature of the invention. FIG. 4 shows the jib in a fully elongated arrangement measuring approximately 6 feet. Alternatively, approximately complete retraction of the tubes is shown in FIG. 5 wherein the jib measures approximately 2 feet in length. By "approximately complete" it is meant that at least a small portion remains outside the lock, but the vast majority of the length of the tube has collapsed onto the adjacent tube. In an illustrative embodiment, collapsing is achieved by loosening the twist-locking rings 162 and sliding the tube sections inside one another. More particularly, tube section 140 slides over tube section 110, which is locked in place adjacent to the top of the bottom bracket 170. Tube section 120 slides into tube section 110, and tube section 130 slides into tube section 120. At the same time, tube section 150 slides through the knuckle of the bottom bracket 170 and tube section 160 slides into tube section 150. The fully collapsed arrangement shown in FIG. 5 can then be secured for transport by tightening the twist-locking rings 162. The resulting arrangement is only slightly longer than one tube section at approximately two feet. This small size is particularly useful in providing ease of portability for photographers and videographers traveling to relatively remote areas because it allows the jib to be carried in a small backpack, travel bag, or other device without concern that a protruding component can be damaged or destroyed by coming into contact with rocks, trees, or any of a variety of environmental obstacles.

Figure 6:
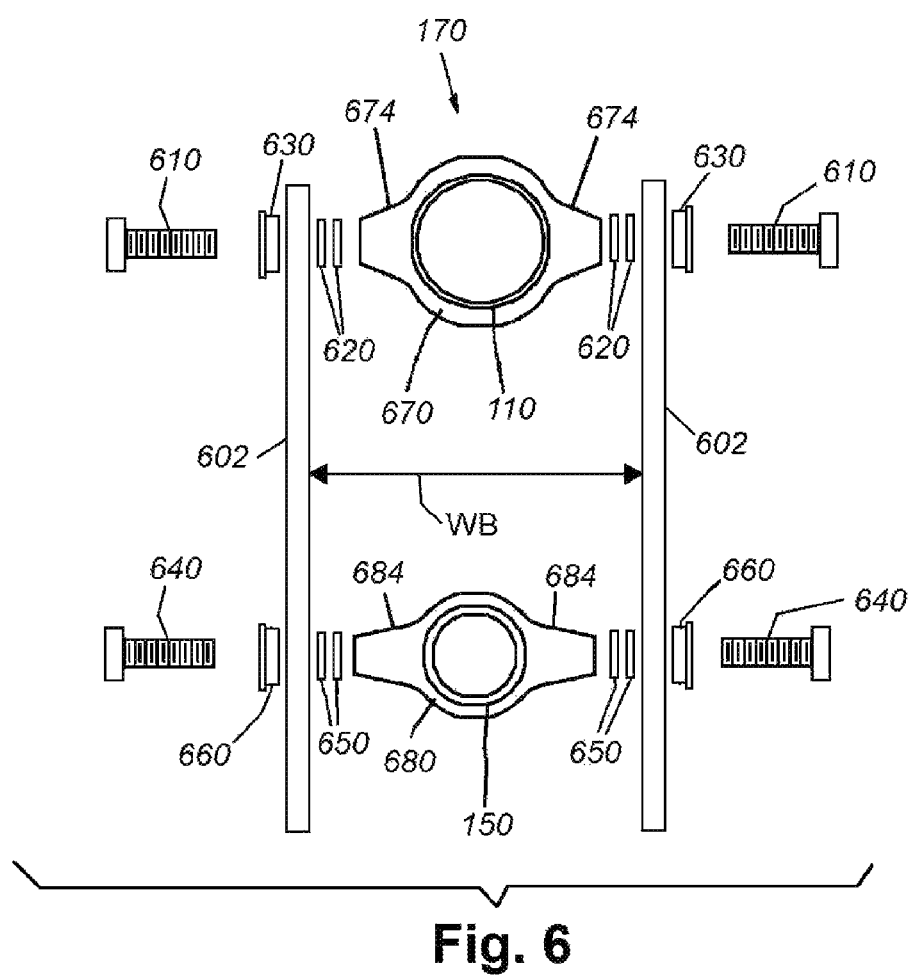
FIG. 6 is an exploded cross sectional view of the bottom bracket mechanism of the jib in FIG. 1.

FIG. 6 shows an exploded cross sectional view of an illustrative embodiment of the bottom bracket in an uncollapsed state demonstrating how the tubes can collapse through this bracket while also maintaining stability during use. The bottom bracket (and top bracket) enclosure can be formed from a metal, such as an aluminum alloy, and is threaded onto end extensions 674 and 684 that are unitarily formed on opposing sides of the respective knuckles 670 and 680. The depicted end extensions are slightly tapered and have sufficient thickness to ensure a firm retention of the respective screw threaded thereinto. More particularly these knuckle end extensions provide extra clearance to receive the length of partially penetrating screws without requiring that they pass into the tube. The extensions allow for threaded holes of between ¼ and ½ inch in an example, although the length is highly variable in further embodiments. The top knuckle 670 is slidably and rotatably fixed to the underlying tube 110 by slight penetration of the screw(s) into the tube wall, or by another securing mechanism (e.g. welds, friction-fit, adhesives, etc.). Conversely (and as described above), the bottom knuckle 680 is free of permanent engagement to the underlying tube 150 and can slide freely relative to the knuckle when collapsing. At the top of the bottom bracket mechanism 170, the bracket plates 602 hold fasteners 610, washers 620 and bearings 630. The width/spacing WB between the plates 602 is sufficient to provide the additional clearance for the knuckle extensions 674 and 684. At the bottom of the bracket mechanism, the bracket plates 602 hold fasteners 640, washers 650 and bearings 660. The fasteners 610 and 640 serve to stabilize the knuckles 670 and 680 in a position adjacent to the bracket plates 602. The knuckles 670 and 680 serve as a sheath holding the jib's tube sections relative to the bracket plates. This arrangement allows fasteners to secure the position of the tubes while in use without (free of) penetrating any individual tube in a manner that would impede the free collapse of the tubes as described above. Conversely, as described below, the screws pass fully through the knuckles and tubes in the region of the top bracket where a fixed pivoting connection is acceptable.

Figure 7:
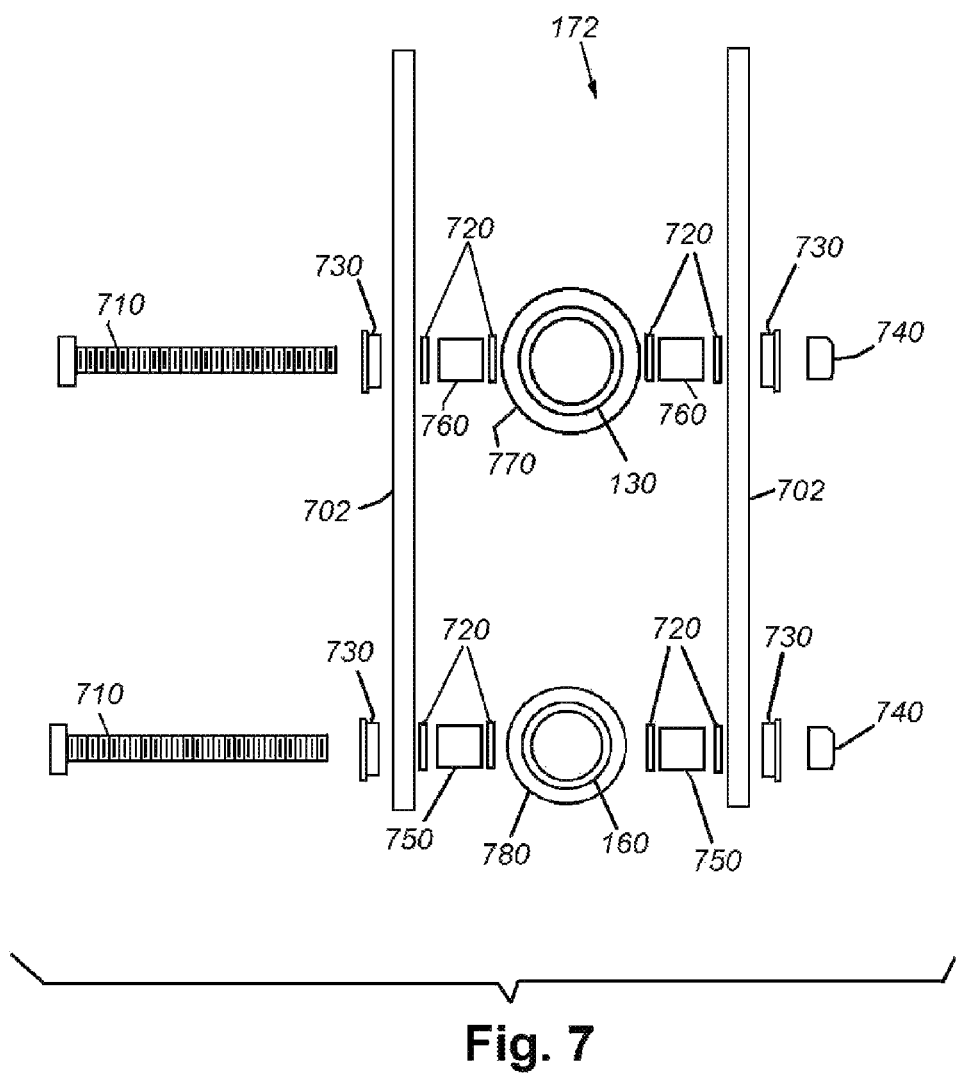
FIG. 7 is an exploded cross sectional view of the top, camera balancing bracket mechanism of the jib of FIG. 1.

FIG. 7 shows an exploded cross sectional view of the top bracket designed to hold a camera. The bracket plates 702 hold bolts or other fasteners 710, secured by washers 720, bearings 730, and locknuts 740. Spacers 750 and 760 ensure proper alignment of sheaths 770 and 780, and the contained tubes 130 and 160. Unlike the bottom bracket, the fasteners 710 in the top bracket penetrate straight through the bracket mechanism. This arrangement allows the jib to maintain a level camera surface at all times because the upper and lower elongated tube sections are of equal length.

Figure 10:
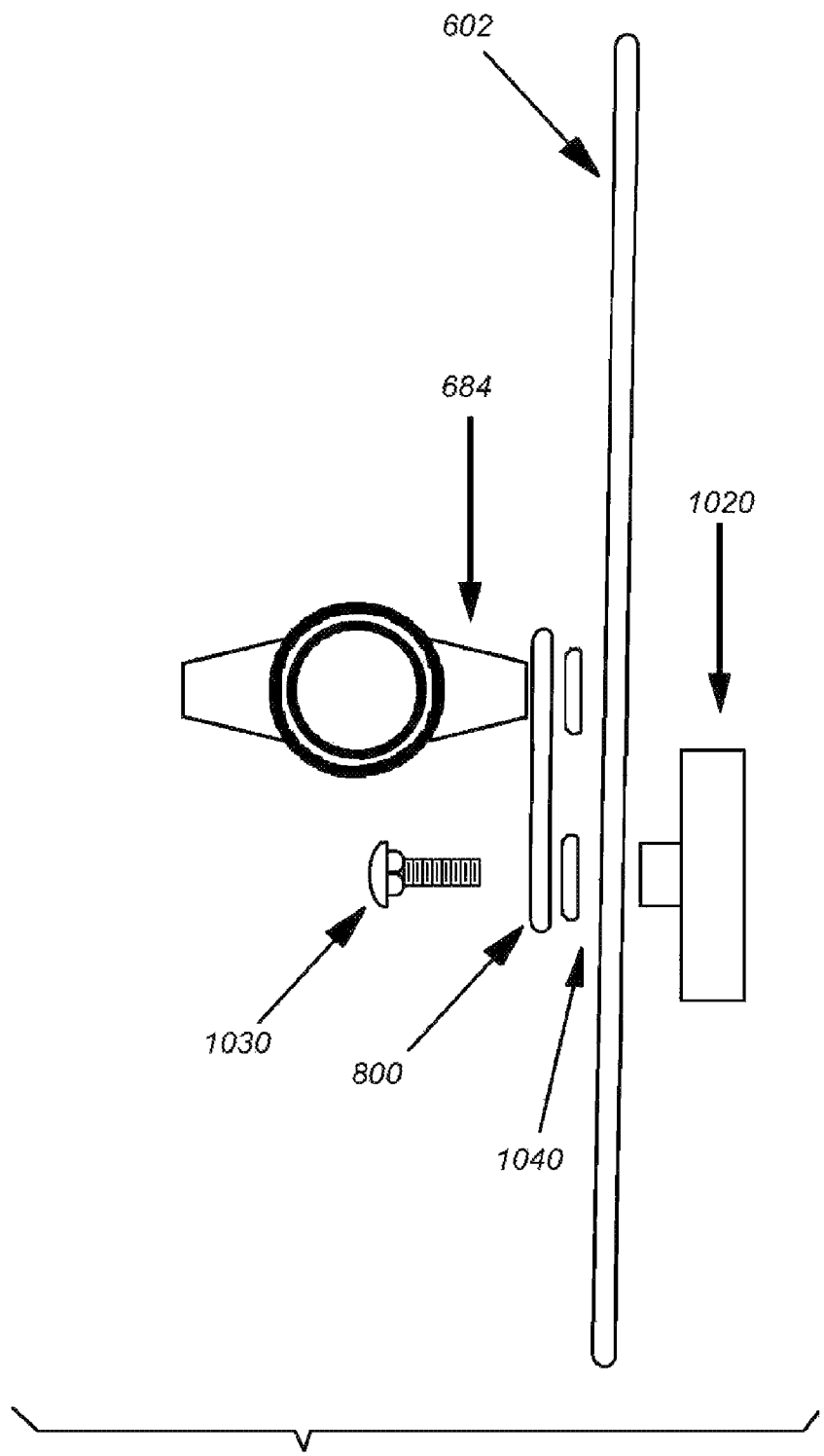
FIG. 10 is an exploded cross sectional view of the tilt lock plate of FIG. 8 fastened to the bottom bracket plate of FIG. 9.

FIGS. 8, 9 and 10 show an embodiment including a tilt locking device 800 that secures the slope of the jib when the user seeks to maintain a particular position. The square cutout 820 fits tight over the lower knuckle end extension 684. A bolt channel 840 illustratively sized for a ¼" bolt aligns with a drill hole 920 on the bracket plate 602. The tilt locking device is secure to the inside of the bracket plate 602 by a screw 1030, washer 1040, and T-knob 1020. Loosening the T-knob 1020 allows the jib's slope to freely pivot up and down. However, tightening the T-knob 1020 frees the tilt locking device 800 at a predetermined position and, as a result, holds the jib at a corresponding slope.

Figure 11:
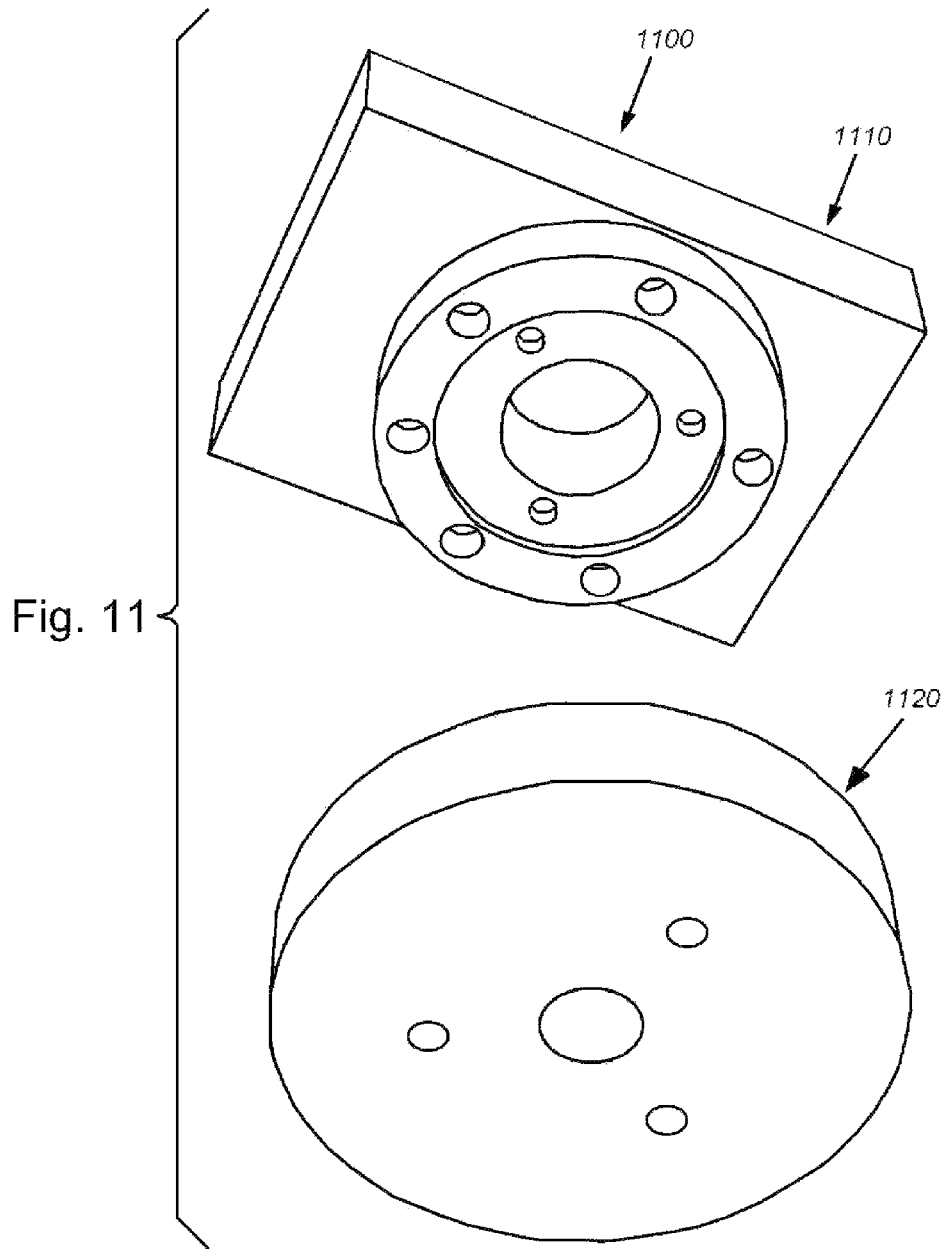
FIG. 11 is a bottom perspective view of the fluid pan base.
Figure 12:
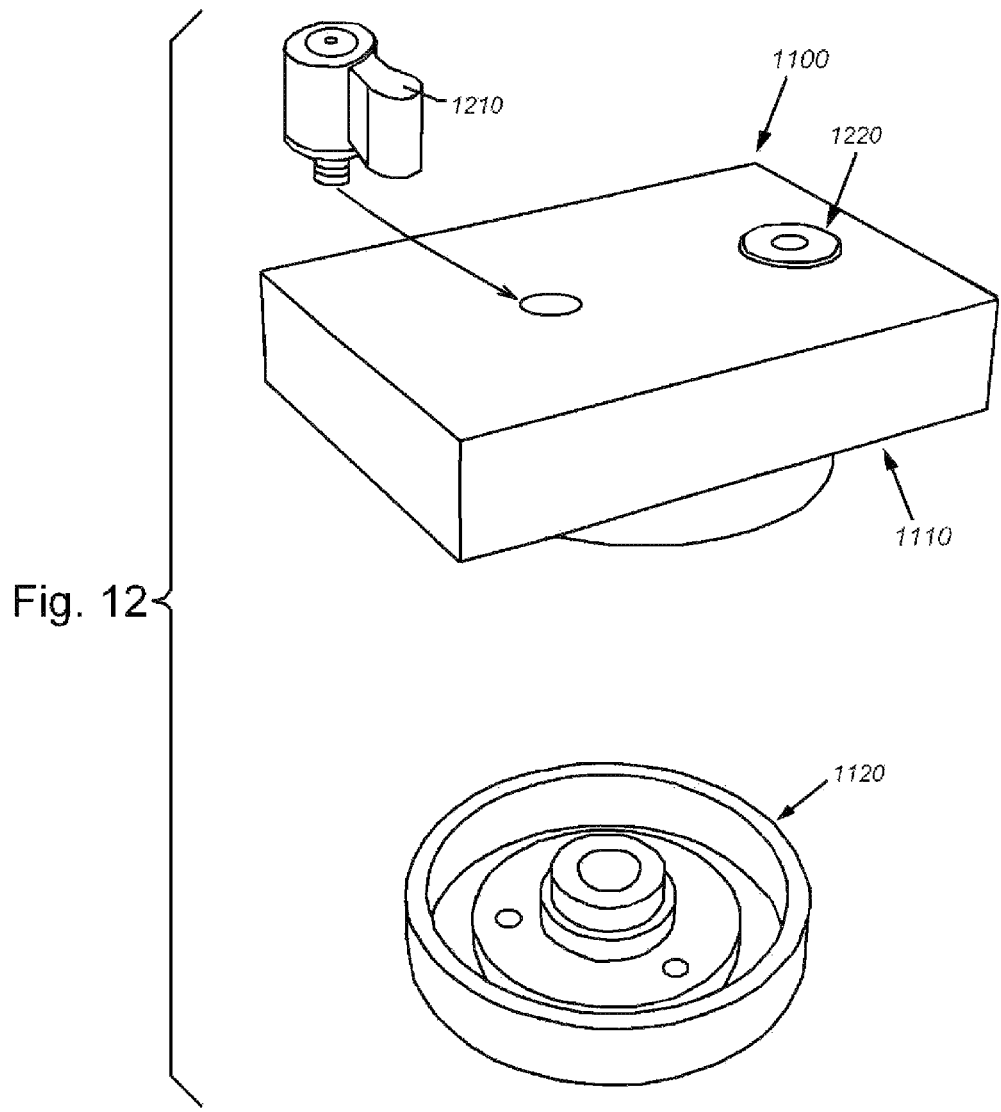
FIG. 12 is a top perspective view of the fluid pan base of FIG. 11.

FIGS. 11 and 12 show an illustrative embodiment of a fluid base pan 1100 which rests on top of a tripod base and at the bottom of the bottom bracket. The fluid base pan can be used to ensure that the bottom bracket, and thus the attached jib in its entirety, sits on a level surface. The base cover 1110 can be freely adjusted to a variety of angles relative to the base pan 1120. As shown in FIG. 12, the base cover 1120 includes a locking knob 1210 and a built-in bubble level indicator 1220. A user can manipulate the base cover 1110 to a level surface. The bubble level indicator 1220 comprises a small air bubble inside a fluid which is contained in container having transparent circular cover. The user confirms that the surface is level when the bubble sits below the center of the circular cover. The desired position of the base cover 1110 relative to the base pan can then be locked by tightening the locking knob 1210.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, the brackets can be constructed from a skeletal design so as to further reduce the jib's weight and increase portability. Additionally, while a proprietary version of a generic twist-lock ring is used to releasably secure sections of the tubing together, a different slide-lock mechanism, such as threaded knobs, can be employed in an alternative embodiment. In such instances, and in other embodiments, the tubes can define a non-circular cross section. For example, a polygonal or ovular structure can be used. Accordingly, this description is meant to be taken only by way of example, and not to otherwise limit the scope of this invention.

What is claimed is:

1. A camera jib comprising:
    a plurality of upper telescoping tubes and a plurality of lower telescoping tubes capable of being locked into a desired extension position by locks between each of the upper telescoping tubes and each of the lower telescoping tubes, respectively;
    a top bracket capable of securely holding a camera, and being pivotally mounted to an end of a first upper telescoping tube of the plurality of upper telescoping tubes and a first lower telescoping tube of the plurality of lower telescoping tubes at respective pivot points; and
    a pivoting bottom bracket securable to a tripod base, and being pivotally mounted to a location along a second upper telescoping tube of the plurality of upper telescoping tubes and a second lower telescoping tube of the plurality of lower telescoping tubes at respective pivot points;
    wherein the bottom bracket includes an upper knuckle and lower knuckle that each pivot with respect to side plates of the bottom bracket, the upper knuckle and the lower knuckle each slidably guiding at least the second upper telescoping tube and second lower telescoping tube so as to allow retraction of the plurality of upper telescoping tubes and the plurality of lower telescoping tubes and bring the top bracket into close proximity with the bottom bracket.

2. The camera jib of claim 1 wherein the second upper telescoping tube is fixedly attached to the upper knuckle, and the second lower telescoping tube is slidably attached to the lower knuckle.

3. The camera jib of claim 1 wherein at least one of the plurality of upper telescoping tubes is slidably collapsible into an interconnected telescoping tube of a shorter length.

4. The camera jib of claim 1 wherein the jib is constructed and arranged to be carried in a configuration in which at least one of the plurality of upper telescoping tubes and at least one of the plurality of lower telescoping tubes are collapsed by an operator.

5. The camera jib as set forth in claim 1 further comprising a lock assembly that secures the plurality of upper telescoping tubes and the plurality of lower telescoping tubes in a predetermined pivoted orientation with respect to the lower bracket.

6. The camera jib of claim 5 wherein the lower bracket includes a pivot that enables rotation with respect to the tripod base.

7. The camera jib of claim 6 wherein the pivot includes a lock.

8. The camera jib of claim 1 wherein the tripod base includes telescoping legs.

\* \* \* \* \*